July 9, 1935.  J. RENGER  2,007,344

AUTOMATIC CAMERA FILM REGISTER

Filed March 23, 1931

Inventor:
Julius Renger
by Harry Sangsam
his Atty.

Patented July 9, 1935

2,007,344

UNITED STATES PATENT OFFICE 2,007,344

AUTOMATIC CAMERA FILM REGISTER

Julius Renger, Philadelphia, Pa.

Application March 23, 1931, Serial No. 524,426

6 Claims. (Cl. 116—114)

My invention relates to indicators and relates more particularly to an indicator for a still-picture camera.

The covering on one side of photographic films used on still-picture cameras, contains numerals indicating the section of the film which may be exposed to complete a picture. After the film is exposed, the film is turned to the next succeeding numeral. Frequently, when pictures are taken, the operator neglects to turn the film to the next succeeding number on the film; or if the film is properly moved to the next number and a considerable period of time elapses between the exposures, the operator at times does not remember whether that particular film has been exposed.

It is an object of this invention to provide an attachment for a still-picture camera to obviate any double exposures on the same film.

With these ends in view my invention embodies an indicator for a camera, the indicator being operated by the exposure lever of the camera.

Other objects of my invention are to provide an improved device of the character described, of simple and economical construction, having a maximum efficiency and accuracy.

With these and other objects in view, my invention consists in the details of construction and combination of parts fully described in the following description when read in conjunction with the annexed drawing in which.

Figure 1:
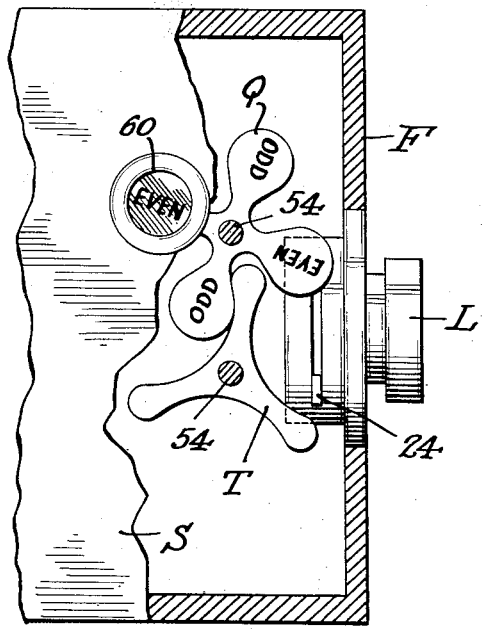
Fig. 1 is a fragmentary side elevational view of a camera with part of the casing cut away showing my invention embodied therein.
Figure 2:
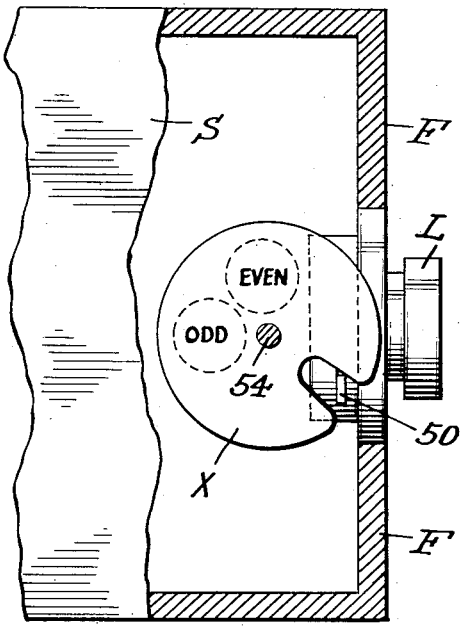
Fig. 2 is a side elevational view of a modification of my invention without its complementary housing.
Figure 3:
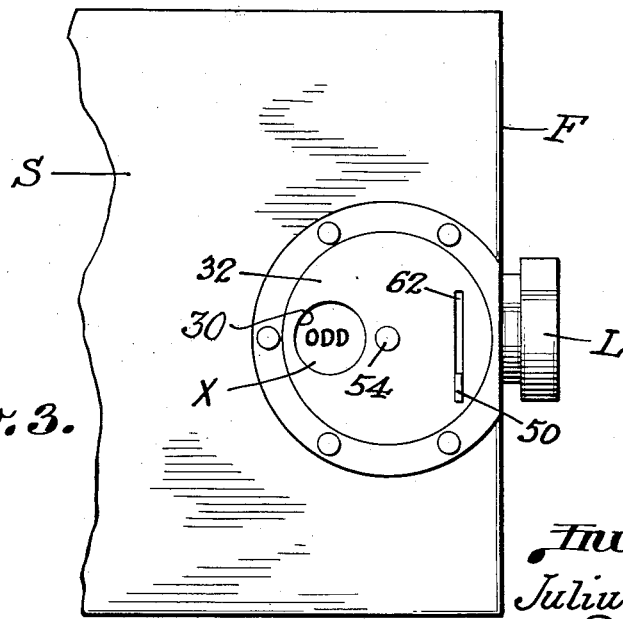
Fig. 3 is a side elevational view of a modification of my invention that is shown in Fig. 2 embodied upon a camera.

Referring in detail to the drawing, my invention is applied to a conventional box type of camera as shown in Figs. 1 to 3 which is comprised of a front wall generally designated as F, and a side wall generally designated as S and a lens L. A lever 24 is pivotally mounted and operates the shutter to control the passage of light through the lens into the interior of the camera.

A tri-lobed wheel, generally designated as T, is mounted upon a fixed stud 54 and is enmeshed with an indicia bearing or indicator quad-lobed wheel, generally designated as Q, and the latter wheel is also mounted upon a fixed stud or pivot. The tri-lobed wheel T is formed with lobes or teeth thereon, and the quad-lobed wheel Q is formed with lobes or teeth.

Upon each lobe of the indicator wheel Q is an indicium, as for example, "odd" or "uneven", the same indicium being placed on alternate lobes. Each indicium when observed by the camera operator will be an indication that the numeral designation on the roll type of film-pack should be "odd" or "uneven", otherwise, the film should not be exposed.

The wheels Q and T are inserted on the camera so they for the most part are hidden from view by a cover. However, a sight opening 60 on the cover is so positioned that but one end of the lobe on the wheel Q may be viewed. The wheels Q and T are, also, positioned so that the lever 24 will, when moved, engage one of the lobes on the wheel T, then one of the lobes on the wheel Q, and then the next lobe on wheel T, and so on, whereby the wheel Q will definitely revolve one-quarter of a revolution as the lever 24 is moved to complete one oscillation.

Referring more specifically to the disclosure in Fig. 1, for the sake of illustration, it shall be assumed that the film is properly turned to its numeral designation 1 and that the indicator reads "odd." The operator exposes the film to record a picture by oscillating the lever 24. As the lever moves upward, it engages one lobe and rotates the indicator wheel Q counterclockwise. However, the wheel Q does not rotate far but rotates the wheel T a sufficient distance clockwise so that a lobe or tooth is directly in the path of the return movement of the lever 24. The lever 24 engages and moves the latter tooth clockwise thereby moving the enmeshed wheels T and Q, and when the lever is at rest, the indicia on the wheel Q, as seen in the sight opening of the camera case, will read "even". The position of the film numeral designation will still remain 1 after the exposure, but the indicator will read "even". The film must then be moved to the next numeral otherwise a double exposure will result. After the number 2 portion of the film is exposed, the reading will be "odd", and the film should then be moved to numeral 3.

In Figs. 2 and 3, a simplified indicator disc X is shown. This indicator is utilized on cameras where the exposure lever does not return to its original position when the shutter is opened to expose the film; or in other words, each single stroke of the exposure lever exposes the film.

Indicia such as "odd" or "even" are placed on the disc X so that both indicia move an equal distance to and from an opening 30 on the casing 32.

An exposure lever 50 engages the sides which define a notch on the indicator disc X. The disc is pivotally mounted about a stud 54. A helical spring (not shown) is located between the wall of the camera and the disc X. A casing 32 hides the major portion of the disc from view and has an elongated slot 62 in its face to permit the exposure lever 50 to freely move therein. The casing 32 also has an opening in its face through which the indicia on the disc may be seen.

When the lever 50 is pushed upward, the indicium "even" is exposed to view through the opening of the casing 32 and when the exposure lever 50 is pushed downward, to expose the film for another picture, the indicium "odd" is exposed to view through the opening of the casing. The film should read or should be moved to read an "even" or "odd" number to correspond to the reading viewed on the indicator in order to prevent a double exposure of the film.

Although the invention has been described in considerable detail, such description is intended as illustrative rather than limiting, as the invention may be variously embodied, and the scope of the invention is to be determined as claimed.

I claim:—

1. In a camera comprising a casing having a sight opening in one wall thereof, a lens and a shutter arranged adjacent said lens to control the passage of light to a film to be acted upon, the combination with an exposure lever arranged to operate said shutter, of a film indicator, said indicator comprising a quad-lobed wheel and a tri-lobed wheel intermeshed with each other, at least one of said wheels having a lobe extending into the path of movement of said exposure lever for engagement thereby as it is moved to expose the film, and means for visibly and successively identifying the lobes of one of said wheels.

2. In a camera comprising a casing having a sight opening in one wall thereof, a lens and a shutter arranged adjacent said lens to control the passage of light to a film to be acted upon, the combination with an exposure lever arranged to operate said shutter, of a film indicator, said indicator comprising a quad-lobed wheel and a tri-lobed wheel intermeshed with each other, said wheels being so arranged that each will alternately have a lobe extending into the path of movement of said exposure lever for engagement thereby as it is moved to expose the film, and means for visibly and successively identifying the lobes of one of said wheels.

3. In a camera comprising a casing having a sight opening in one wall thereof, a lens and a shutter arranged adjacent said lens to control the passage of light to a film to be acted upon, the combination with an exposure lever arranged to operate said shutter, of a film indicator, said indicator comprising a quad-lobed wheel and a tri-lobed wheel intermeshed with each other, said wheels being so arranged that one wheel will have a lobe extending into the path of movement of said exposure lever to be engaged by said lever as it is moved in one direction to expose the film and then the other wheel will have a lobe extending into the path of movement of said lever to be engaged thereby as said lever is moved in the opposite direction, and means for visibly and successively identifying the lobes of one of said wheels.

4. In a camera having a shutter operating exposure lever, a register comprising a plurality of multi-lobed wheels operably interconnected, said multi-lobed wheels being adapted to be engaged by said exposure lever, film identifying characters on one of said lobed wheels, and means to particularize said film identifying characters.

5. In a camera having a shutter operating lever, a plurality of multi-lobed wheels operatively intermeshed, one of said wheels having film identifying characters thereon, said wheels being so mounted as to be actuated directly by said camera exposure lever when it is moved to expose the film, and means to particularize said film identifying characters.

6. In a camera comprising a casing having a sight opening in one wall thereof, a lens and a shutter arranged adjacent said lens to control the passage of light to a film to be acted upon, mechanism for indicating a portion of said film comprising a pair of multi-lobed intermeshing wheel members and film identifying characters on one member, a lever arranged to operate said shutter and said mechanism, and means for pivotally mounting each of said lobed wheel members on a wall of said casing, and said sight opening being so arranged on said camera as to single out successively the film identifying characters.

JULIUS RENGER.